United States Patent [19]
Kirchhofer et al.

[11] Patent Number: 5,487,164
[45] Date of Patent: Jan. 23, 1996

[54] DISTRIBUTION-BASED REPLACEMENT SELECTION SORTING SYSTEM

[75] Inventors: Richard Kirchhofer, Fremont; Bruce A. Wagar, San Jose, both of Calif.

[73] Assignee: International Business Machines Corporation, Armonk, N.Y.

[21] Appl. No.: 121,328

[22] Filed: Sep. 14, 1993

[51] Int. Cl.$^6$ .................................................. G06F 7/36
[52] U.S. Cl. ........................... 395/600; 364/DIG. 1; 364/222.9; 364/282.1; 364/283.2
[58] Field of Search .......................... 395/600; 340/146.2

[56] References Cited

U.S. PATENT DOCUMENTS

| | | | |
|---|---|---|---|
| 4,210,961 | 7/1980 | Whitlow et al. | 395/600 |
| 4,575,798 | 3/1986 | Lindstrom et al. | 395/600 |
| 4,809,158 | 2/1989 | McCauley | 395/600 |
| 5,396,622 | 3/1995 | Lee et al. | 395/600 |

OTHER PUBLICATIONS

Nagler, H., "Amphisbaenic Sorting", Journal of the ACM, Oct. 1959, pp. 459–468.
Knuth, Donald E., "The Art of Computer Programming—Volume 3/Sorting and Searching", 1973 by Addison–Wesley Publishing Co., pp. 170–180, 347–360.
Friend, E. H., "Sorting on Electronic Computer Systems", Journal of the ACM, vol. 3, No. 3, Jul. 1956, pp. 134–168.

*Primary Examiner*—Paul V. Kulik
*Attorney, Agent, or Firm*—Baker, Maxham, Jester & Meador

[57] ABSTRACT

An external data record sorting system that adaptively combines elements of both the distribution-based and the comparison-based sort procedures. The internal distribution-based sorting procedure generates sorted record strings that are twice as long on average as the available internal memory storage space. This MSB radix distribution procedure is adaptively optimized to data file characteristics by a predetermined threshold test that halts the distribution pass for a bin containing fewer records than a predetermined threshold number, which are then immediately sorted using a simpler comparison-based sorting procedure. This system also overlaps the input file reads and secondary storage writes between distribution sequences, thereby minimizing the non-overlapping portions of input/output operations and internal processing operations. As sorted records are written to secondary storage and new records are moved from the input file, the new records may be added to the current distributive sort tree, thereby minimizing the total number of strings created. Because new records are moved in from the input file concurrently with the removal of sorted records to the output area, the average output string can be twice the size of internal storage. By minimizing the number of strings that are later merged to complete the sort, overall external sorting procedure time is minimized.

8 Claims, 9 Drawing Sheets

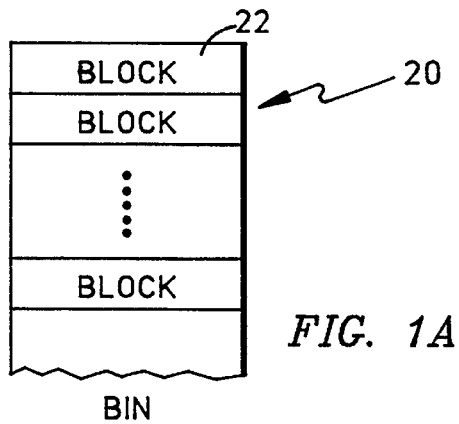
FIG. 1A
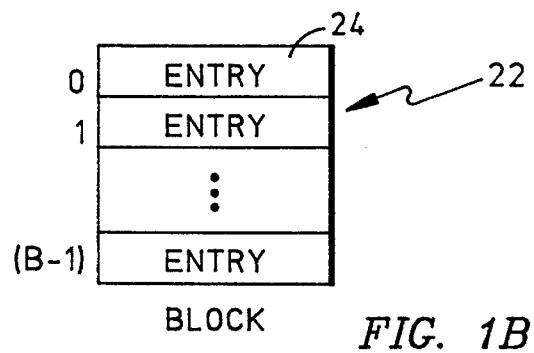
FIG. 1B
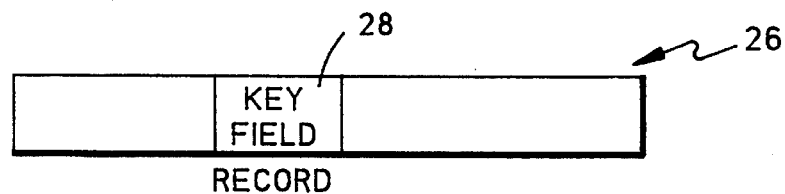
FIG. 1C
FIG. 1D
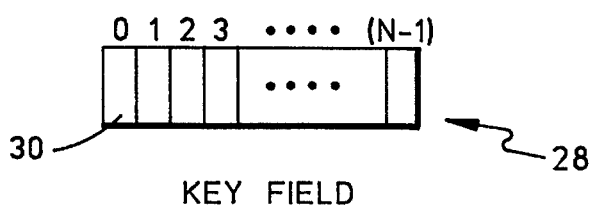

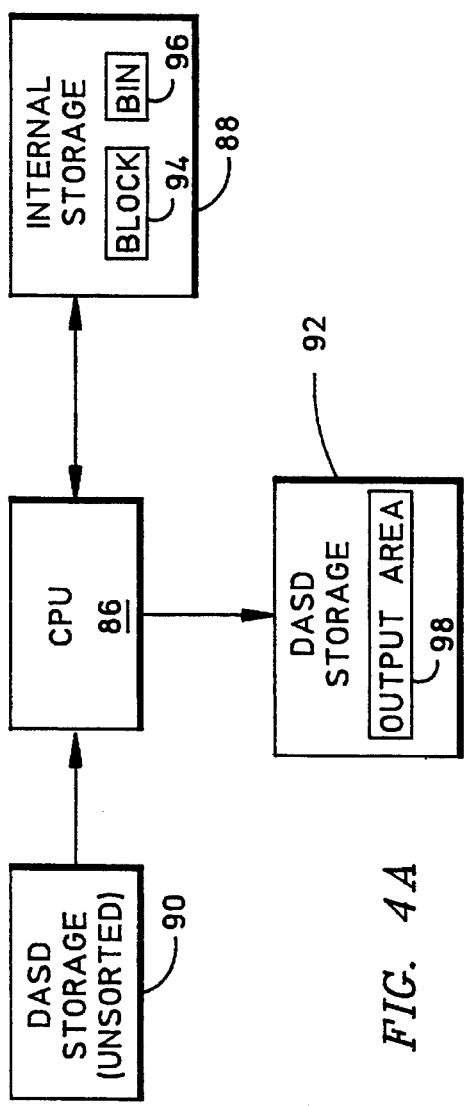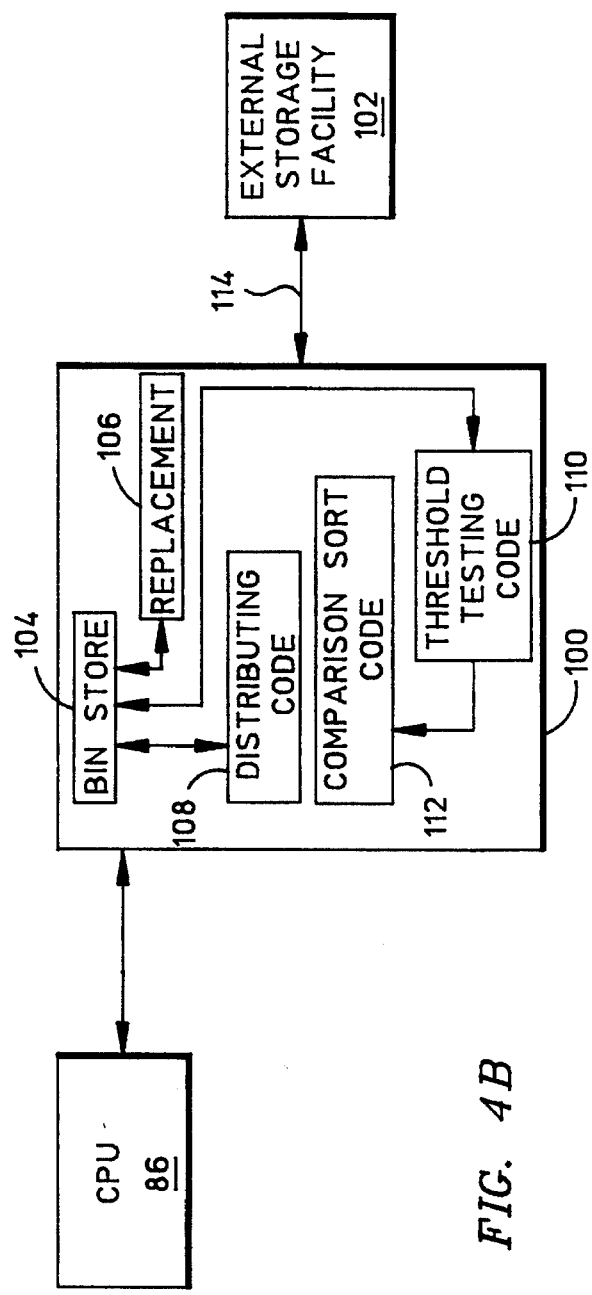

```
ALGORITHM ASA;
    INPUT records
    WHILE not EOF DO
        ALLOCATE bin set BIN(K,M) where K corresponds to the
            Kth digit of a record's key and M to the number of
            values that a key digit may take on
        FOR each record DO
            Add record to BIN(K,J) where J corresponds to the
            value of the Kth digit of a record's key
        END
        FOR each value J (from smallest to largest value)
                of the Kth key digit DO ONEOF
            1) If no records in BIN(K,J), skip the bin
            2) If K=key-size OUTPUT BIN(K,J) records
            3) If BIN(K,J) contains less than T records
               use a comparision sort or decision tree
               then OUTPUT the sorted records
            4) Otherwise use ASA on the (K+1)th key digit using the
               records contained in BIN(K,J) as input
        END
    END
END FUNCTION OUTPUT
    WRITE records to secondary storage
    INPUT new records
END FUNCTION INPUT
    READ records from input file until internal
        storage is filled
    FOR each record read DO
        Add record to BIN(1,J) where J corresponds to the
        value of the first key digit; those records put into
        a bin already processed for the current string will
        become part of the next string; those records
        assigned to a bin that has yet to be processed will
        become part of the current string Note:  For the case where the records of BIN(1,J) are
               already undergoing processing, the new record may
               be added to BIN(1,J) and be made a part of the next
               string or it may be introduced into a sub-bin
               (i.e. BIN(2,x), BIN(3,y), etc.) of BIN(1,J) and
               made a part of the current string. Whether it
               is added to a sub-bin depends on whether the new
               record's key is greater than the key of the last
               record output.
    END
END
```

FIG. 5

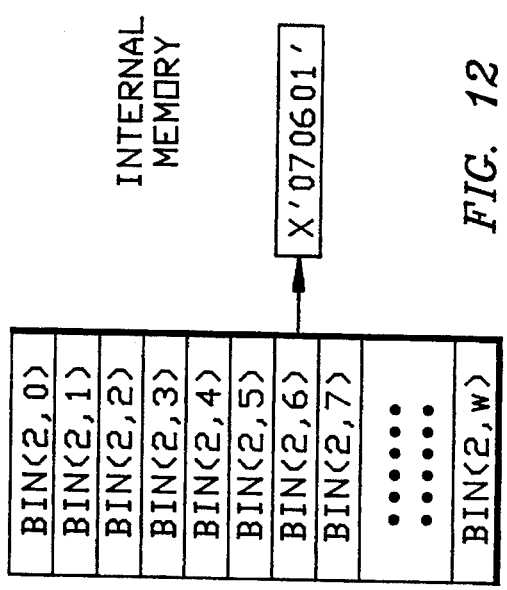
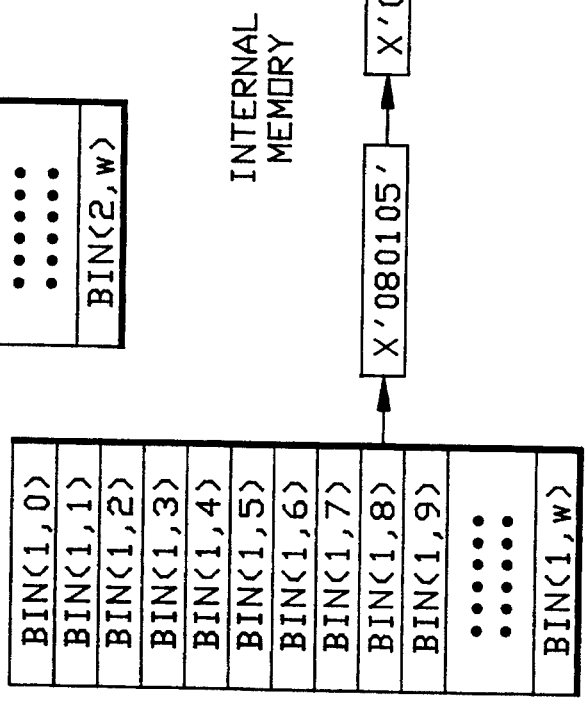

DISTRIBUTION-BASED REPLACEMENT SELECTION SORTING SYSTEM

CROSS-REFERENCES TO RELATED APPLICATIONS

This patent application is related by common inventorship and subject matter to a application entitled "System For MSD Radix Sort Bin Storage Management", filed on even date herewith as patent application Ser. No. 08/121,812 (Assignee Docket SA9-92-053) now issued as U.S. Pat. No. 5,440,734, which is entirely incorporated herein by this reference.

BACKGROUND OF THE INVENTION

1. Field of the Invention

This invention relates to systems for distributive sorting and, more specifically, to an external Most Significant Digit (MSD) radix sorting system that switches adaptively to comparison-based sorting of distribution bins according to a predetermined bin-count threshold test and immediately replaces sorted records taken from internal memory with new unsorted records to lengthen output strings.

2. Description of the Related Art

Sorting is the process of arranging items in a "order" and is generally acknowledged to be one of the most time-consuming computer-implemented procedures. The procedures known in the art for sorting computer data records according to their associated key fields may be loosely classified in terms of efficiency as a function of the number of records to be sorted.

For small numbers of records (e.g., 2–100), a first class of sorting procedures having minimal overhead steps unrelated to record numbers are most efficient. This first class of procedures includes the insertion, selection and bubble sorts and generally includes the simplest procedures requiring a sorting time proportional to the square of the size of the group of records to be sorted ($N^2$). A second class of sorting procedures are most efficient for intermediate group sizes of up to 100,000 records. This second class of procedures requires sorting time proportional to $Nlog_2N$ and includes the Quicksort and Heapsort procedures known in the art. A third class of sorting procedures are generally useful for very large groups of records because they can be efficiently implemented with modern computers and require a sorting time proportional to DN, where D is the number of sort key digits and N is the number of records in the group, but these procedures also require substantial number-independent procedural steps. This class includes the distribution (bin) or "radix" sorting procedure. The numerous sort overhead steps make this class of procedures inefficient for smaller numbers of records.

Classical sorting procedures known in the art may also be characterized according to whether or not the sort is accomplished entirely within the internal memory local to the Central Processing Unit (CPU) executing the sort. An "external sort" denominates the class of sorting techniques applicable to data files that exceed the capacity of primary or internal memory. This class of sorting procedures relies on additional secondary storage, such as Direct Access Storage Devices (DASDs), tapes and drums. In the merge sort, which is one type of external sort procedure, subsets of a file are moved (read) into internal memory, ordered internally, and then rewritten in sorted order to an external device or secondary storage facility. One such technique, the "replacement-selection" sort, produces from the unordered "input file" an intermediate file containing one or more ordered lists or strings of records. Replacement-selection sorting produces ordered strings of varying length, the average length being twice the capacity of the internal memory. The record strings may then optimally be merged into one ordered string by forming a "minimal merge Huffman tree", as is known in the art. Most external sorting methods in the art for data stored on external disk drive are merge-based.

The well-known distributive or radix sorting procedure requires sorting time proportional to DN. Such procedures employ one of two available approaches for recursively distributing records according to their key field values. The keys are distributed to form one or more subgroups and the distribution is collected so as to preserve or maintain an order among the subgroups. The distribution is accomplished by comparing each key against an extrinsic attribute and then assigning the key to a subgroup or bin. The collection sequence preserves the overall order of the key field representations. Each key field is herein presumed to contain D "digits" or bytes, each digit having a radix of M. Each key field in a group of records is then distributed to one of M bins selected in accordance with the value of one of the key digits. After the group is completely distributed among M new subgroups or bins, the distribution process is repeated for each new subgroup in turn for another key digit. The process concludes when the smallest subgroups are transferred in order to an output area. Depending on the approach selected, the distribution of key field representations begins either according to the Least Significant Digit (LSD) or the Most Significant Digit (MSD) in the key field. The only difference between these two approaches is the key field scanning direction.

The MSD radix sort procedure requires that unsorted bins be maintained in storage while the procedure continues recursively through the key field digits until all the records in the first bin in the first rank are sorted and moved to the output area. Then the second bin in the first rank is similarly distributed recursively according to the second MSD, the third MSD, etc., and the third bin in the first rank is similarly distributed and so forth. Every group of record keys generates up to M new subgroups of next rank during distribution (M=the radix of each key digit). Each of the subgroups is then sorted on the next MSD to create a series of lower ranks. The entire process forms a sort tree where the root represents the original group of record keys, the interior nodes represent subgroups subject to further distribution passes and the leaf nodes represent the final single element or LSD sort bins that are moved to the output area. Because the MSD radix sort is a depth-first procedure, the distributed but unsorted bins at each rank must be maintained in memory awaiting completion of the deep distribution pass for each preceding bin sort. This makes the traditional radix bin sort an "internal" sort procedure accomplished entirely within the local internal memory.

Since distribution-based sorting procedures are "internal sorts", they produce a sorted list or "string" of data records with a length equal to the size of available internal memory. When sorting a data file larger than available internal memory space, several strings are produced by a radix bin sort and these must be merged together with a merge sort to produce the final sorted output file. This merge requirement reduces the sorting efficiency proportionally to the log of the number of intermediate strings produced by the distribution-based sorting procedure.

Many practitioners in the art have suggested improvements to computer-implemented external sorting procedures to increase sorting speed. For instance, in U.S. Pat. No. 4,575,798, Eugene E. Lindstrom et al. disclose an external sorting method that employs random sampling of the key fields to develop a template for partitioning in a single pass the unsorted file into equal size partitions of records, each partition being small enough to fit within available internal memory. Their technique is optimized for associative external memory applications.

Reference is made to U.S. Pat. No. 4,210,961, wherein Duane L. Whitlow discloses a classical merge-based external sorting procedure.

Practitioners in the art have also suggested many improvements to the distribution-based internal radix sorting procedure. For instance, in U.S. Pat. No. 4,809,158, Peter B. McCauley proposes the use of an auxiliary table (his "bin used" table) to account for all digit values actually encountered during the current distribution of a group of key field representations. If the number of encountered values is less than a predetermined threshold number, McCauley then sorts the auxiliary table and uses the table entry value to index (point) into the list of subgroups and identify tile non-empty subgroup rather than merely sequentially scanning tile entire list of M subgroups. McCauley adds the additional overhead steps of accumulating and sorting his "auxiliary tables" and indirectly addressing the subgroup list. Also, in copending patent application Ser. No. 07/813,246 filed on Dec. 23, 1991 now U.S. Pat. No. 5,396,622, Kai Wan Lee et al, disclose a MSD sorting procedure using a dynamic branching table to eliminate the steps of collecting empty subgroups during the recursive distribution phase of their sort. The Lee et al. application solves several of the problems seen in the McCauley invention and is entirely incorporated herein by this reference.

Thus, the present practice in the art for sorting large data record files efficiently is to divide the file into partitions small enough to fit within the internal memory, load each partition into memory and perform an efficient internal (e.g., distribution-based) sort on the loaded partition. When the internal sort is completed, the sorted partition is moved to an output area as a single record string. The next partition is then loaded. The process is repeated until all partitions have been sorted into strings. These strings are then processed with an inefficient merge-based procedure to produce the final sorted record file.

There is accordingly a clearly-felt need in the art for an improved external sorting procedure that reduces or eliminates the time required for the less efficient merger of the strings produced by a sequence of efficient internal sorts without replacement-selection (efficient merger of strings made by a sequence of less efficient internal sorts). The efficiency advantages of the many recent improvements to the internal distribution-based sorting procedures are alone insufficient to offset the inefficiencies associated with repeated input and output of record groups and the relatively slow merger of the sorted record strings. These unresolved problems and deficiencies are clearly-felt in the art and solved by this invention in the manner described below.

SUMMARY OF THE INVENTION

The system of this invention improves distribution/merge external sorting efficiency by making several changes. First, the system of this invention halts each internal distribution pass when a bin is found to contain less than a predetermined threshold number of records and substitutes a simple comparison-based sorting procedure to quickly complete the record sort within that particular bin without normal distribution overhead. This adaptively improves the internal distribution sorting efficiency responsive to data file characteristics. Secondly, new records are moved into internal memory to immediately replace each sorted record moved to the output area. Each new record moved into internal memory is assigned to the appropriate distribution bin according to its key field value. If the new record key is greater than the key of the most recent sorted record moved to the output area, the new record is added to the current internal distribution sorting sequence. If not, it is held in the appropriate first-rank bin awaiting restart of the sequence. This increases average string length, thereby reducing merger activity. Finally, the system of this invention reads from the input file and writes to the output area in the time intervals between the bin distribution procedures. This maximizes the overlapping portions of the input/output procedures with internal processing and thereby minimizes the overall external sorting time.

It is an object of this invention to improve the input data file partitioning efficiency as one element of overall external sorting efficiency. It is a feature of the system of this invention that the internal radix sorting process proceeds continuously from lowest to highest key field values and then returns to the lowest-valued key field to repeat the process until the input file is exhausted. This continuous partitioning occurs because the system of this invention immediately replaces each sorted record moved to the output area with a new record from the input area and immediately distributes each such new record into the active sort tree. It is an advantage of this feature that the average output string length is doubled, thereby halving the number of strings to be merged to complete the external sort.

It is another object of the system of this invention to improve internal radix sorting procedure efficiency. It is a feature of the system of this invention that the radix sort tree is generated beginning with the Most Significant Digit (MSD) of the key field, thereby exploiting whatever procedural efficiency is available from the distribution of record key field values. It is also an advantage of the method of this invention that immediate sort completion of all bins having fewer than a threshold number of record entries increases the sorting speed at the lower sort tree ranks and improves internal sorting efficiency.

It is yet another object of the system of this invention to optimize overlapping of input, output and processing activities. It is an advantageous feature of this invention that the processing and input/output activities are overlapped where possible and the duration of the periods where no overlapping is possible are minimized by reducing the number of records processed between each input/output operation and each distribution pass so that an optimal balance is achieved between the reduced duration of non-overlapped activities and the additional processing overhead required for the reduced procedural granularity.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIGS. 1A–1D show the relationship between radix sorting bins, contiguous storage blocks, record entries and record key fields used to describe the invention herein;

FIGS. 4A and 4B show functional block diagrams of an illustrative embodiment of the system of this invention;

FIG. 5 shows a preferred embodiment in PASCAL-like pseudocode of the method of this invention;

FIG. 12 shows the internal memory contents after replacement of the second sorted bin in the example of FIG. 6; and FIG. 13 shows the internal memory and output area contents after moving a third sorted bin to the output area in the example of FIG. 6.

DETAILED DESCRIPTION OF THE PREFERRED EMBODIMENTS

Figure 2:
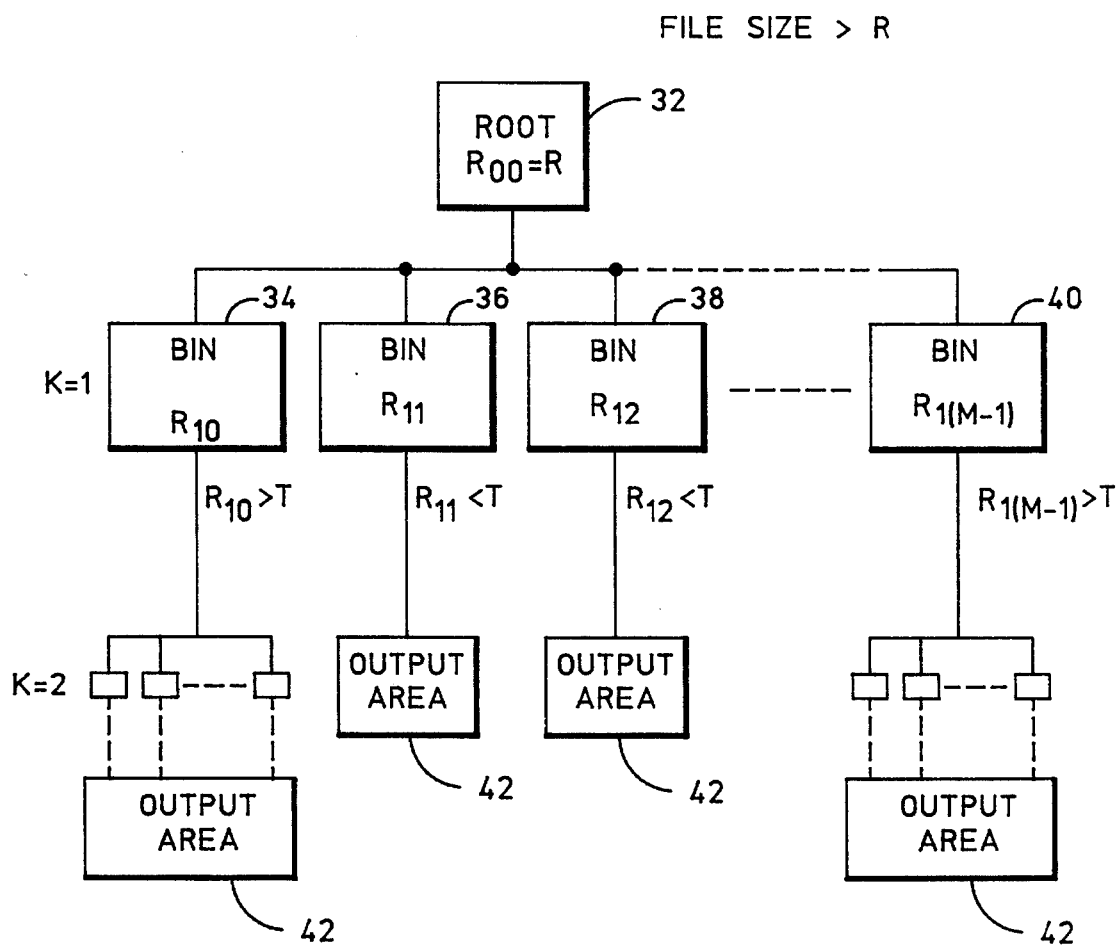
FIG. 2 provides an illustrative example of the MSD radix sort tree showing the bin threshold sorting selection method of this invention.

FIG. 1, including FIGS. 1A–1D, shows a relationship between the various terms used herein to denominate storage of data. FIG. 1A shows a storage bin 20 that consists initially of a linked list of blocks of contiguous storage exemplified by the block 22. FIG. 1B provides a detailed illustration of block 22 from FIG. 1A. Block 22 includes contiguous storage space sufficient to hold a plurality B of entries exemplified by entry 24, although block 22 may be limited to a single entry in some applications. FIG. 1C illustrates a data record 26 having a key field 28. Data record 26 may contain substantially more than key field 28, which is used to establish the sort order position for record 26. Entry 24 in FIG. 1B may be any useful representation of key field 28 known in the art, such as key field 28 itself or an address pointer referring to key field 28 stored elsewhere in memory. Entry 24 may also include other data in addition to a representation of key field 28. FIG. 1D shows key field 28 in more detail, revealing a plurality D of digits exemplified by the Most Significant Digit (MSD) 30. Each digit exemplified by digit 30 may assume any of a plurality M of values. As used herein, M is denominated the "radix" of digit 30. All digits in key field 28 are herein presumed to be of the same radix M.

FIG. 2 is an example of a radix distribution sort tree that shows the recursive characteristics of the radix distribution sort procedure used herein. This MSD radix sort is a depth-first process and may be fully appreciated with reference to the above-cited Wagar patent application. When a bin at rank K is processed, the M new bins formed at the next lower rank K+1 are first completely distributed before proceeding with another bin at rank K.

Referring to FIG. 2, the root of the MSD distribution tree represents the bin 32, which includes the entire partition contained in the internal memory employed by the sorting procedure. The internal memory capacity is herein presumed to be R records, which is also herein presumed to be fewer than the total number of records in the input storage area that are to be sorted. As the first partition of plurality R data records are input to the internal memory (not shown), the MSD of each key field is used to assign each record to the appropriate same-attribute bin of the first rank (K=1). Thus, when the internal memory (not shown) is first filled with the initial plurality R of data records, all records are assigned to one of the M first rank same-attribute bins exemplified by bins 34, 36, 38 and 40. Bin 34 contains all data record entries having key fields wherein the MSD is zero. Bin 36 contains data record entries having key fields with MSD=1, bin 38 has MSD=2 and bin 40 has key fields with MSD=M−1.

According to the method of this invention, the lowest valued MSD bin in rank K=1 (that is, bin 34) is first distributed. Because the number of entries $R_{10}$ is greater than a predetermined threshold value T, in the example shown in FIG. 2, the data record entries in bin 34 are distributed to the next rank K=2 according to the value of the second most significant digit of their key fields. Thus, all data record entries in bin 34 are distributed to M same-attribute subgroups where the attribute similarity is the value of the second MSD in the key field of each data record entry. The subgroups are then similarly distributed according to the recursive procedure of this invention until all subgroups in rank K=2 are completely sorted and removed to the output area 42.

Note that whenever records are moved to output area 42, a like number of unsorted records are brought into memory and distributed to the appropriate bins, thus perhaps later joining the current string in output area 42. All other rank K=1 bins are meanwhile held in the internal memory awaiting processing. Also, all active bins in ranks K=2, 3, etc., used in the distributive processing of the data record entries of bin 34 are held in memory awaiting processing. The only exception to this recursive distribution procedure is where the number of data record entries in a bin are fewer than the predetermined threshold T. This can be seen in connection with bins 36 and 38 in FIG. 2. Bin 36 has $R_{11}$ data record entries, where $R_{11}$ <T. According to the method of this invention, after bin 34 is removed to output area 42, the data record entries of bin 36 are immediately sorted without further distribution using any useful sorting procedure known in the art (e.g., comparison sort) and are moved in sorted order to output area 42. No second rank bins are created. No recursive distribution occurs.

After the contents of bin 36 are removed to output area 42, bin 38 is then tested against predetermined threshold T and either distributed or immediately sorted and removed to output area 42, depending on the results of the comparison. In FIG. 2, the $R_{12}$ entries in bin 38 are immediately sorted and moved to output area 42 because they are fewer than threshold T.

The process continues along the first (K=1) rank bins until the last bin 40 is distributed. Because bin 40 holds more data entries than threshold T, it is recursively distributed as discussed above in connection with bin 34. When bin 40 is completely distributed, the process returns to bin 34 and continues again along the first K=1 rank of bins. This procedure terminates only when all records in the original input storage area file are completely sorted and removed to output area 42. It should be appreciated that returning to bin 34 initiates a new sequential sort string in output area 42. Because each record removed to output area 42 is immediately replaced with new records from the input storage area in internal memory, internal memory is already fully loaded with data records when the new string starts.

Figure 3:
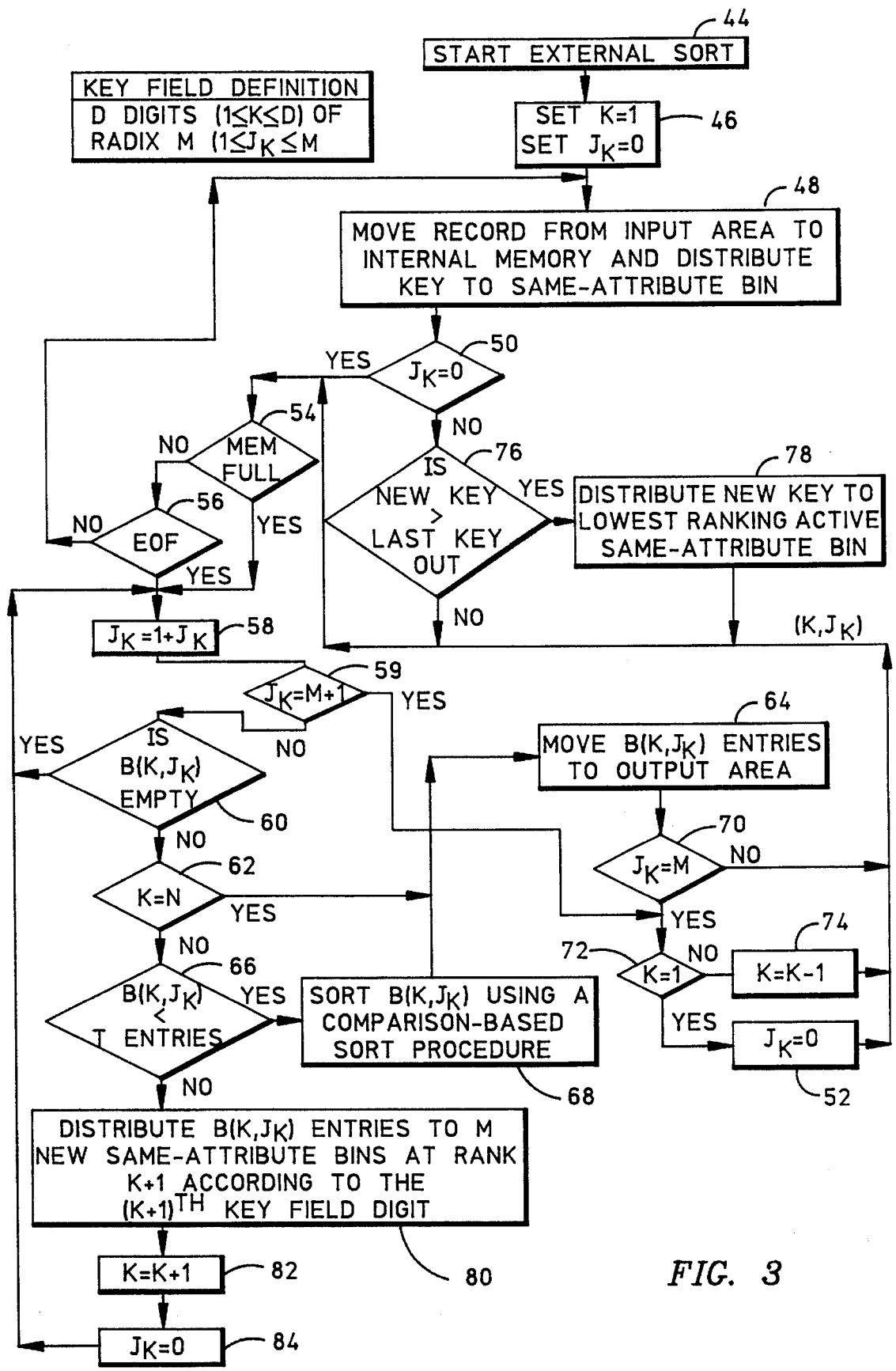
FIG. 3 is a functional block diagram of an illustrative embodiment of the method of this invention.

FIG. 5 provides an exemplary PASCAL-like pseudocode embodiment of the method of this invention shown in FIG. 3, which is now described.

FIG. 3 provides a functional block diagram of an illustrative embodiment of the method of this invention beginning with the "Start External Sort" step 44. Although FIG. 3 does not explicitly show the "Merge Strings" or "End Sort" steps, these portions of the sorting system of this invention are performed in any useful manner known in the art after all data records have been removed from internal memory to the output area as a plurality of sorted strings. Upon starting at step 44, the bin indices are initialized as shown in step 46. The sort tree ranking index K represents the key field digit position tested when distributing record entries to the same-attribute bins. At each rank K, the plurality of M bins are indexed by $J_K$, which ranges from 1 to M and tracks the value ($J_K-1$) of the $K^{th}$ key field digit assigned to the $J_K^{th}$ same-attribute bin. Thus, index initialization step 46 starts the th procedure at the first sort tree rank K=1 and $J_K$=0 is set to a value below the range of bin attributes. This $J_K$=0 setting informs the procedure that the internal memory still has space for additional entries from the external input storage area.

Step 48 then moves one data record from the input storage area to internal memory and immediately distributes a representation of the data record key field to the appropriate same-attribute bin in the first rank. After moving one record in step 48, the value $J_K$ is tested for zero at step 50. This value is always zero when first loading the internal memory and is again set to zero in step 52 after completion of an output sort string, when the procedure has finished a pass through the M first-rank bins. Although step 84 also sets $J_K$=0, step 58 immediately increments $J_K$ to "1".

After finding $J_K$=0, step 54 looks for a full internal memory and, if space exists, then checks for an End-Of-File (EOF) condition in the input storage area at step 56. If space exists in internal memory and no EOF condition is detected, the procedure returns to repeat step 48, moving another data record into internal memory. This loop proceeds until either detecting EOF or finding internal memory to be full, at which point it switches to step 58, which increments the $J_K$=0 bin index. $J_K$ is tested for equality to (M+1) at step 59. If $J_K$=M+1, no unsorted bins remain at rank K and K is then tested and decremented at step 72 as discussed below. The first execution of step 58 sets $J_K$=1, which corresponds to the first bin in rank K (digit value=0).

When first indexing to bin $B(K, J_K)$, the bin is tested for entries at step 60. If $B(K, J_K)$ is empty, step 60 immediately returns to step 58 and $J_K$ is incremented to the next bin at the $K^{th}$ rank. If $B(K, J_K)$ has entries, K is checked for equality to D at step 62. If K=D, then all entries in $B(K, J_K)$ are equal and they may be immediately moved to the output area in step 64 as a block of data records having equal key field values. If K≠D then the number of $B(K, J_K)$ entries is tested against a predetermined threshold T at step 66. If $B(K, J_K)$ has fewer than T entries, then the $B(K, J_K)$ entries are immediately sorted using a (comparison-based) sort procedure in step 68 without further distribution to new same-attribute bins. After $B(K, J_K)$ is completely sorted in step 68, then all elements from $B(K, J_K)$ are moved to the output area in sorted order in step 64.

When $B(K, J_K)$ is removed to the output area at step 64, space is immediately made available in the internal memory. The next few steps of the procedure in FIG. 3 demonstrate how this space is immediately filled with new entries from the input storage area responsive to the removal of entries to the output storage area.

After completion of step 64, the bin index $J_K$ is tested for equality to M at step 70. Step 70 determines whether any undistributed bins remain in this pass through rank K. If $J_K$=M, no unsorted bins remain in this pass at rank K and K is then tested at step 72. If K=1 at step 72 then a pass through all first rank same-attribute bins has been completed, which completes an output string. Thus, $J_K$ is reset to zero at step 52 and control is returned to step 54 to top-off internal memory preparatory to restarting another string. If K≠1 at step 72 then the sort tree rank K is decremented at step 74 to move the procedure up to the next higher sort tree rank. By decrementing K in step 74, the bin index is switched to the existing $J_K$ value at that rank. After refilling internal memory (steps 54, 56 and 48), step 58 then increments $J_K$ to select the next bin $B(K, J_K)$ at the higher sort tree rank for processing. If $J_K$≠M at step 70, control is returned to step 54 to refill internal memory without changing either K or $J_K$.

An important feature of the system of this invention is the procedure for replacing sorted records immediately upon their removal to the output area at step 64. This occurs by returning control to step 54 and testing for full memory (and EOF at step 56). If internal memory is not full and no EOF is detected, then step 48 is again executed to move one more data record from the input storage area to internal memory. Step 50 then tests $J_K$ against 0. In this "replacement" portion of the input cycle, $J_K$≠0 and step 76 then tests the new key field value against the key field value for the last data record removed to the output area. If the new data record key field exceeds the key field of the last data record removed to the output area, then the new data record is distributed by step 78 to the lowest ranking active same-attribute bin presently retained in internal memory.

Step 78 distributes each new key according to the values of the key field digits and allocates it to the appropriate active lower-rank bin. This allocation permits the new data record to be distributed in the current pass along with the other entries in the active bin, thereby increasing the length of the current output string beyond internal memory capacity If the new key is not greater than the key of the last removed data record, then step 76 returns control to step 54 and the new data record is left in the appropriate first-rank sort tree bin to which it was distributed in step 48. During the current pass through the first rank bins, their contents are gradually replaced by this procedure and, when step 52 is executed to start another pass (new string), all bins in the K=1 rank of the sort tree are already fully loaded. Note that steps 64 and 78 can be done concurrently either for one record or a plurality of records to improve processing overlap.

Returning to step 66, if $B(K, J_K)$ has more than T entries, then $B(K, J_K)$ is distributed to the $(K+1)^{th}$ sort tree rank in step 80. Step 80 creates M new bins at the $(K+1)^{th}$ rank, which are then handled by the procedure of FIG. 3 in the same fashion as the M bins in the first rank. This recursive feature is characteristic of MSD radix sorting procedures. After distribution in step 80, the rank index K is incremented in step 82 and the bin index is reinitialized in step 84. Control is then returned to step 58 and all other subsequent procedures are conducted as described above.

The procedure discussed above in connection with FIG. 3 has several advantages. Generally, the procedure uses distributive sorting. A comparison-based sorting method is used when a bin contains a relatively small number of data record entries. This procedure switches back and forth to use whatever sorting method is best for the particular bin being sorted, thereby adapting to the characteristics of the sorted data to minimize CPU time.

Also because of the speed mismatch between internal memory processing and data input/output transfers from and to secondary storage, the elapsed time of any external sorting procedure is generally bounded by the slower input/output time. To minimize the elapsed time required, the system of this invention overlaps as much internal processing as possible with the input/output activity. Because the procedure of this invention offers the natural process breaking points at step 64 (FIG. 3), the step 64 breaking point can be used to execute the step 48 transfers from the input storage area if steps 64 and 48 are not overlapped. The preferred method of this invention minimizes such non-overlapping processes, thereby minimizing overall elapsed time for the external sorting process.

FIGS. 4A–4B show the functional block diagrams of two exemplary systems for implementing the adaptive sorting procedure of this invention described above in connection with FIG. 3. In FIG. 4A, a Central Processing Unit (CPU) 86 is coupled to an internal storage device 88 and two Direct Access Storage Device (DASD) storage facilities 90 and 92. Internal storage device 88 includes at least one block of contiguous storage space 94 and at least one distribution sorting bin 96. DASD 90 contains a first group of unsorted records, each having a key field (FIG. 1). DASD 92 includes an output area 98 for receiving the sorted data record strings.

FIG. 4B shows another example of a system for suitable for executing the procedure discussed above in connection with FIG. 3. CPU 86 is coupled to an internal data storage facility 100, which is in turn coupled to an external storage facility 102. The file to be sorted and the output area (sorted record strings) are located in external storage facility 102. Internal data storage facility 100 contains several objects required for performing the adaptive external sorting procedure of this invention.

In facility 100, the bin store 104 provides storage management and space for the distribution sort bins. A replacement controller 106 is coupled to bin store 104 to immediately replace data records removed to the output storage with new records from the input storage area file to be sorted, thereby ensuring that the internal memory capacity is always fully used. A distributing code 108 is coupled to bin store 104 to distribute the data record entries in each bin to a plurality M of subgroups at the next lower rank K=K+1 as discussed above in connection with FIG. 3. The threshold testing code 110 is also coupled to bin store 104 to test each sort bin against a predetermined threshold T to determine whether the bin is to be distributed in accordance with distributing code 108 or to be sorted in accordance with a comparison sort code 112. Comparison sort code 112 sorts the contents of a bin using at least one of the several useful comparison-based storing procedures known in the art, such as the insertion sort. The unsorted data records from external storage facility 102 are transferred to internal data storage facility 100 on the data bus 114. The sorted bin entries are removed from internal data storage facility 100 to the output storage area in external storage facility 102 on the same data bus 114.

FIG. 5 shows a preferred embodiment of the method of this invention in PASCAL-like pseudocode, which may be appreciated with reference to the above discussion in connection with FIG. 3.

To better appreciate the advantages of this invention, consider that an external sort may simply generate strings by filling the internal memory with data records, sorting the records, and removing the sorted string to the output area. Many conventional sorting procedures use this approach. Records are read into storage, sorted, and then written to a secondary storage device. For such procedures, the total number of strings produced is CEILING (size of file/internal storage space).

An alternative method for generating strings is the replacement-selection procedure known in the art. For the replacement-selection procedure, the total number of strings produced must be between one and CEILING (size of file/internal storage space), with the average number of strings generated (assuming random data) being 0.5*CEILING (size of file/internal storage size). The actual number of strings produced depends on the distribution of the data.

The adaptive external sorting procedure of this invention processes subsets of the data record file. As soon as the entries from a single sorting bin are removed to the output storage area, additional data records are moved into memory from the input storage area. Before any other processing resumes, these new records are distributed according to their first key-digit value and may be added to bins that are actively assigned but have not yet been examined during the pass through the current string. In this way, new data records can be introduced to a string already in progress. For randomly distributed data, the adaptive sorting procedure of this invention can produce strings that are twice the size of internal storage space, similarly to the replacement selection-procedure.

The advantage of creating larger strings is clearly evident. The total number of strings is reduced, the number of subsequent string merging passes is reduced, the seek and latency time associated with DASD merging procedure is reduced and CPU time is saved because the total number of comparisons required during string merging is reduced. The overall result is higher merger efficiency.

The inventors have measured processor efficiency for the adaptive external sorting procedure of this invention and have found that CPU time is typically reduced by 45% and overall processing time is typically reduced by 35% over existing external distribution-merger procedures.

Sorting Example

Figure 6:
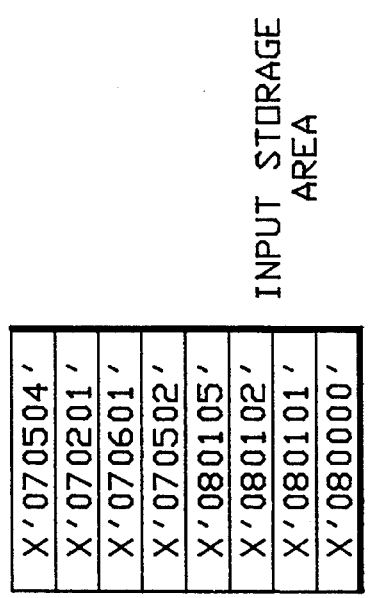
FIG. 6 shows an input area file of key fields used for an example of the procedure of this invention.

The following sorting example is included herein to assist in appreciation of the above discussion in connection with FIGS. 3 and 5. For this example, FIG. 6 shows an input storage area data file that must be sorted. Each record entry in the data file has three (3) key field bytes or digits (D=3) of radix M. For the purposes of this example, internal memory capacity is assumed to be four (4) data records. Moreover, for B(K, J), K represents the key digit under examination and J represents the value of the key digit. The maximum value that a key digit can assume (M−1) is represented by "w". A string is produced by sorting all records of B(1, J) and concatenating these records to the sorted records of B(1, J−1). During the sorting procedure, records of B(1, J) may be subdistributed into B(2, J), then B(3, J), and so forth.

Figure 7:
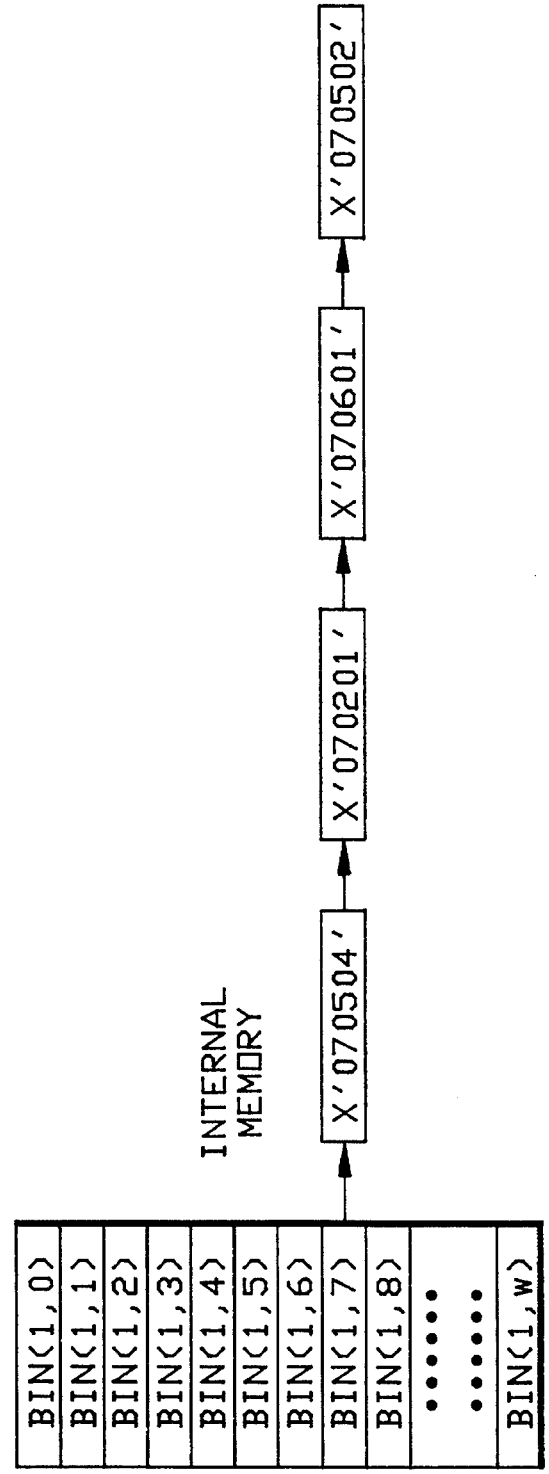
FIG. 7 shows the internal memory contents when first loaded in the example of FIG. 6.

The input file is read sequentially. The first four records are moved into internal memory and distributed by their first key digit value. Because the first four records have the same first key digit value (X' 07'), the first four records are distributed to the same bin B(1, 7) as shown in FIG. 7.

Once internal memory space is exhausted, all bins associated with the first key digit are examined in order. The first seven bins have no entries and are immediately discarded. The first active bin containing data record entries is B(1, 7). If the predetermined threshold T is assumed to be T=2, then B(1, 7) must be further distributed because the number of entries exceeds T=2. This distribution of B(1, 7) must occur before proceeding to examine the next bin B(1, 8).

Figure 8:
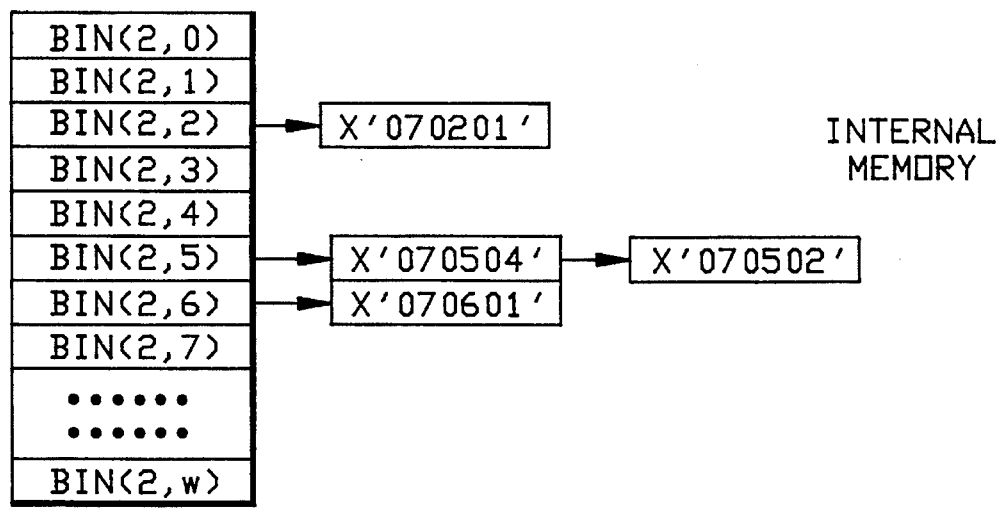
FIG. 8 shows the internal memory contents after a first distribution in the example of FIG. 6.
Figure 9:
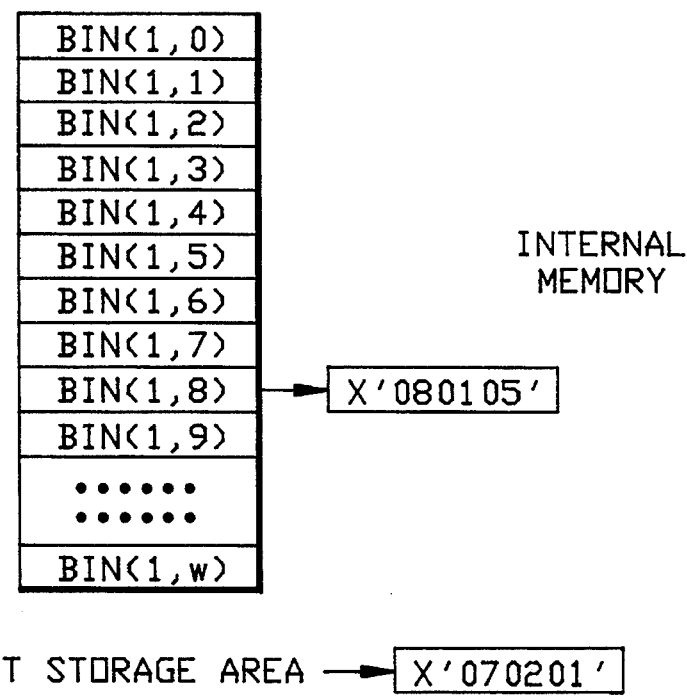
FIG. 9 shows the internal memory contents after replacement of the first sorted bin records in the example of FIG. 6.

In FIG. 8, all data record entries of B(1, 7) are distributed into M bins of second rank using the second digit of each record's key field. When distribution is completed, each second-rank bin is then examined in order from top to bottom. The first bin found to contain record entries is B(2, 2). Since B(2, 2) contains only one record, the single record entry is output immediately to the output area in secondary storage, as shown in FIG. 9. Because the one record is removed from internal memory, a new record is now moved into internal memory. The next record from the input file is moved into memory and distributed according to its first digit key value, as shown in FIG. 9.

FIG. 9 shows the contents of B(1, J) after the new data record is moved in from the input storage area and distributed by its first key digit value. Notice that while a distribution for B(1,7) is still in progress, the new record is moved in and assigned to B(1, 8) in the same string. Once the new record is moved in and distributed, processing continues with the sort bin already in progress. In this example, the remaining record entries from B(1, 7) are now distributed.

Figure 10:
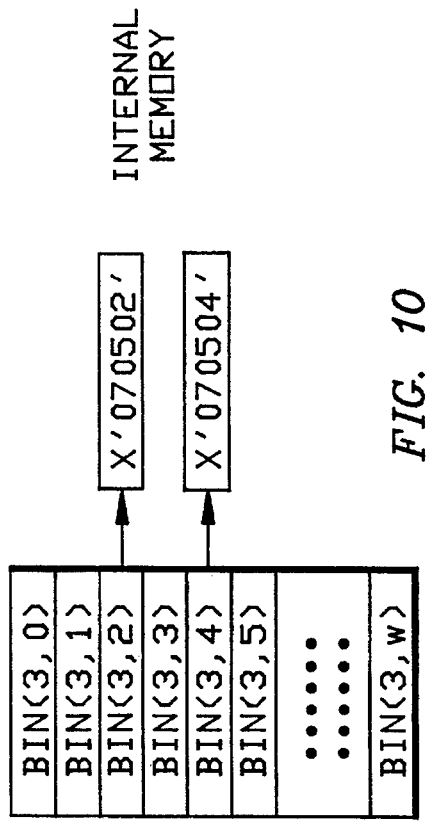
FIG. 10 shows the internal memory contents after a second distribution in the example of FIG. 6.

The next bin examined having record entries in FIG. 8 is B(2, 5). Because B(2, 5) contains two records, which equals or exceeds the threshold value T=2, then these two records must be further distributed using their third key digit value. FIG. 10 shows a resulting third-rank distribution of B(2, 5).

The active third rank bins in FIG. 10 are examined in order from top to bottom. One record is found in B(3, 2) and one record in B(3, 4). Because the original key size is assumed to be N=3 digits, all records in any active bin of the K=3 =D rank are already sorted and are then immediately removed to the output storage area in bin order. As each record is removed to the output storage area, internal memory space is made available for new records from the input storage area.

Figure 11:
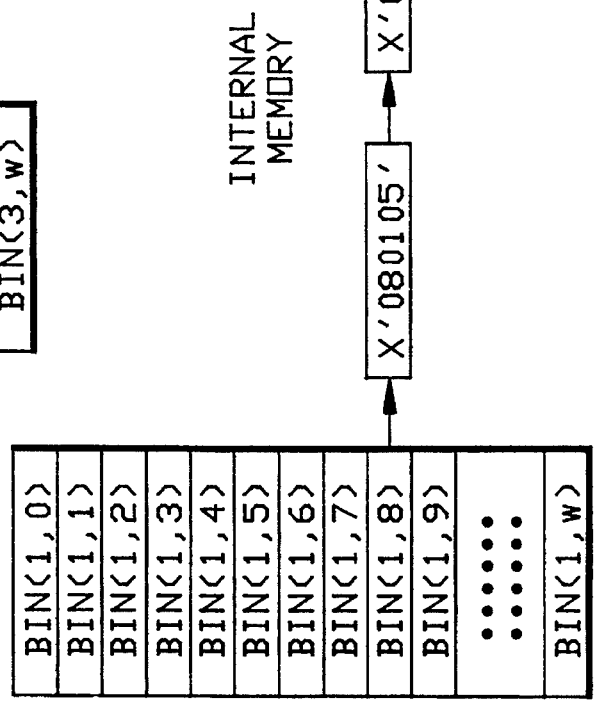
FIG. 11 shows the internal memory and output area contents after moving a second sorted bin to the output area in the example of FIG. 6.

FIG. 11 shows the contents of B(1, J) after replacing the two records from B(2, 5) removed to the output storage area. Note that the two new records are moved in and distributed to B(1, 8) before completion of the distribution and sort of the B(1, 7) data record entries.

Continuing the examination of B(2, J) of FIG. 8, the next bin encountered with record entries is B(2, 6) as shown in FIG. 12. Because B(2, 6) has only one record, the one record is immediately removed to the output storage area and replaced in memory with the next record of the input file. FIG. 13 shows the contents of B(1, J) after all record entries of B(1, 7) have been processed.

The processing of B(1, 8) proceeds similarly to the processing of B(1, 7) as discussed above. As all the records of B(1, 8) are distributed, they are concatenated to the current string in the output storage area. Thus, in this example, with a storage space limitation of four records, the adaptive external sorting procedure of this invention constructed a single output string consisting of eight records in a single pass.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A computer-implemented method for distributively sorting a first plurality of data records according to their key fields, each said key field having a plurality N of digits of radix M, wherein said first plurality of data records are initially stored in unsorted order in an input storage area and are moved in intermediate or final sorted order to an output storage area, wherein N and M are positive integers, said method comprising the unordered steps of:

(a) moving a second plurality R of said data records from said input storage area into an internal memory means:

(b) assigning each of said second plurality R of said data records to a $J^{th}$ same attribute bin, where J is the value of the most significant key field digit of said each data record:

(c) recursively distributing the record entries of each of said same-attribute bins, each recursion including the ordered steps of (c.1) if said each same-attribute bin has no said record entries or one said record entry only or a plurality of identical said record entries only, then removing all said each bin record entries to said output storage area, otherwise (c.2) comparing each said record entry of said each same-attribute bin against an extrinsic attribute and assigning said each record entry to one of a plurality M of same-attribute subgroups and (d) until said input storage area is empty, replacing in said internal memory means some or all of said sorted record entries removed into said output storage area, each replacement including the ordered steps of:

(d.1) moving one or more of said first plurality of data records from said input storage area to said internal memory means, and (d.2) assigning each said new data record to the $J^{th}$ said same-attribute bin, where J is the value of the most significant key field digit of said each new data record, and (d.3) if the key field value of said each new data record meets or exceeds the key field value of said sorted record entry most recently removed to said output storage area, assigning said each new data record to said same-attribute subgroup most closely matching said each new data record extrinsic attribute, otherwise holding said each new data record for assignment during a subsequent said recursion.

2. The method of claim 1 wherein performance of said moving step (d.1) overlaps the performance of said moving step (c.1).

3. The method of claim 2 wherein said recursive distributing step (c) further comprises the step of:

(c.1.1) if said each same-attribute bin contains fewer than T said record entries, then sorting said each bin record entries without further distribution and removing all said sorted record entries to said output storage area, wherein T>1 is a predetermined threshold equal to positive integer.

4. The method of claim 1 wherein said recursive distributing step (c) further comprises the step of:

(c. 1.1) if said each same-attribute bin contains fewer than T said record entries, then sorting said each bin record entries without further distribution and removing all said sorted record entries to said output storage area, wherein T>1 is a predetermined threshold equal to positive integer.

5. A system for sorting a first plurality of records according to their key field values, each said key field having a plurality N of digits of radix M, wherein N and M are positive integers, said system comprising:

input storage means for storing said first plurality of records in an initial order;

output storage means for storing said first plurality of records in one or more strings in key-field order;

internal memory means coupled to said input storage means and to said output storage means for storing groups of representations of said key fields;

recursive distributing means coupled to said internal memory means for comparing each of a group of said key fields against an extrinsic attribute in a sequence of recursions and for assigning said each key field to one of a plurality M of same-attribute subgroups;

record replacing means coupled to said internal memory means and said input storage means for moving one or more new data records from said input storage means into said internal memory means to replace said sorted record entries removed from said internal memory means to said output storage means; and conditional distributing means coupled to said record replacing means for assigning each said new data record to said same-attribute subgroup most closely matching said extrinsic attribute of said each new data record when said each new data record key field value meets or exceeds the key field value for said sorted record entry most recently removed from said internal memory means to said output storage means and otherwise for holding said each new data record for assignment during a subsequent said recursion.

6. The system of claim 5 wherein said record replacing means operates immediately subsequent to said threshold sorting means, thereby maximizing the operational overlap of said distributing and said moving operations.

7. The system of claim 5 wherein said record replacing means operates immediately subsequent to said threshold sorting means, thereby maximizing the operational overlap of said distributing and said moving operations.

8. The system of claim 5 further comprising:

threshold sorting means coupled to said internal memory means for sorting and removing to said output storage means without further distribution the record entries of each said same attribute subgroups having fewer than T said record entries, wherein T>1 is a predetermined threshold equal to a positive integer.

* * * * *